United States Patent [19]
Sundberg

[11] Patent Number: 6,029,918
[45] Date of Patent: Feb. 29, 2000

[54] KITCHEN WASTE COMPOSTER

[76] Inventor: Henric Sundberg, 5035 North Service Road, Unit C9, Burlington, Ontario, Canada, L7L 5V2

[21] Appl. No.: 09/100,019

[22] Filed: Jun. 19, 1998

[51] Int. Cl.[7] .............................. B02C 17/02; B02C 18/40
[52] U.S. Cl. ........................ 241/79.3; 241/86.1; 241/87; 241/169.1; 241/DIG. 38
[58] Field of Search .................................. 241/79.3, 168, 241/85, 169.1, 86.1, 87, DIG. 38, 176, 101.8; 435/290.1, 290.2, 290.3, 290.4; 366/220, 236

[56] References Cited

U.S. PATENT DOCUMENTS

| | | | |
|---|---|---|---|
| 2,480,716 | 8/1949 | Derfler | 259/3 |
| 3,818,865 | 6/1974 | Sinclair | 119/1 |
| 4,165,184 | 8/1979 | Schlarmann | 366/12 |
| 5,215,267 | 6/1993 | Taylor | 241/101.8 |
| 5,254,472 | 10/1993 | Brooks, III et al. | 435/312 |
| 5,501,978 | 3/1996 | Sundberg | 435/290.3 |
| 5,589,391 | 12/1996 | Fink | 435/290.3 |
| 5,592,900 | 1/1997 | Kakuta | 119/164 |
| 5,605,834 | 2/1997 | Eberthson et al. | 435/290.3 |
| 5,843,769 | 12/1998 | Jonninen | 435/290.3 |

*Primary Examiner*—John M. Husar
*Attorney, Agent, or Firm*—Ingrid E. Schmidt

[57] ABSTRACT

Vegetable matter is composted in an outer drum having an axis for rotation which is disposed horizontally for rotation inside an outer housing. The outer drum and the housing have respective waste inlets which are in communication with each other for receiving waste so that waste which is introduced into the housing is received inside the outer drum. An inner drum having an axis for rotation which is disposed horizontally for rotation of the inner drum is disposed inside the outer drum, and receives waste from the outer drum. A waste outlet in the inner drum discharges decomposing waste into a finishing drawer. The configuration of the outer drum with the inner drum disposed inside, allows for a two-stage decomposition of waste matter, thereby maximizing the capacity of the composter while occupying a minimum of space which is customarily at a premium in the kitchen environment.

10 Claims, 6 Drawing Sheets

6,029,918

KITCHEN WASTE COMPOSTER

FIELD OF THE INVENTION

This invention relates to a composter for kitchen waste and is particularly directed to a space-saving configuration of the container into which the waste is introduced.

BACKGROUND OF THE INVENTION

While the art of composting has been practiced for many years, the means provided to practice composting inside the home have not advanced to any appreciable extent. Commonly, home-owners will dispose of kitchen scraps into a bucket or other container which may be provided with a lid. Less frequently, special purpose containers fitted with activated carbon odor absorption means are used. The bucket is periodically emptied into a garden composter where the waste is left in a heap to decompose. If the home-owner is keen, the compost heap will be turned at regular intervals and appropriate activators will be added to the heap to promote decomposition.

Characteristically, the garden composter is located in a remote area of the yard, where it will be hidden from view. As a result, journeys to empty the bucket from the kitchen become an unwelcome chore, particularly in the winter in areas enjoying colder climates.

An object of this invention is to provide a composter which will facilitate composting of kitchen waste inside the home. One of the challenges is to provide a container having sufficient capacity for decomposing the waste while occupying a minimum of space.

SUMMARY OF THE INVENTION

In accordance with this invention, there is provided a composter adapted to receive kitchen waste comprising vegetable matter. The composter is characterized by an outer drum having an axis for rotation which is disposed horizontally for rotation inside an outer housing. The outer drum and the housing have respective waste inlet means which are in communication with each other for receiving waste so that waste which is introduced in to the housing is received inside the outer drum. An inner drum having an axis for rotation which is disposed horizontally for rotation of the inner drum is disposed with a first end wall thereof inside the outer drum and spaced from a closed end wall of the outer drum. Waste outlet means formed in a second end wall of the inner drum and spaced from th e first end wall is adapted to discharge decomposing waste through an open end wall of the outer drum.

In addition, the outer drum has liquid outlet means formed in a side wall remote from the waste inlet means and a liquid drain tray is disposed beneath the liquid outlet mean s and is adapted to be removed from the housing. A compost finishing drawer is adapted to receive decomposing waste exiting from the waste outlet means and is also adapted to be removed from the housing. Rotation means are provided for turning the outer drum and also for turning the inner drum. In use, waste received inside the outer drum is mixed and enters waste inlet means of the inner drum when a minimum load has been exceeded. Continued rotation of the inner drum causes the decomposing waste to mix further and to eventually leave the waste outlet means for final decomposition in the compost finishing drawer.

In a preferred embodiment of the invention, the outer drum comprises an outer cylindrical wall, a closed end wall and an open end wall defining an opening which receives the inner drum, the inner drum comprising an inner sleeve having an outer cylindrical wall and an open end wall formed integrally with the open end wall of the outer drum, the open end wall defining the waste inlet means for the inner drum. Most preferably, the inner drum additionally comprises an outer sleeve having an outer cylindrical wall and an open end wall defining the waste outlet means, the outer sleeve and the inner sleeve together defining a side wall for the inner drum.

BRIEF DESCRIPTION OF THE DRAWINGS

In order that the invention may be more clearly understood, a preferred embodiment is described below with reference to the accompanying drawings, in which.

DESCRIPTION OF THE PREFERRED EMBODIMENT

Figure 1:
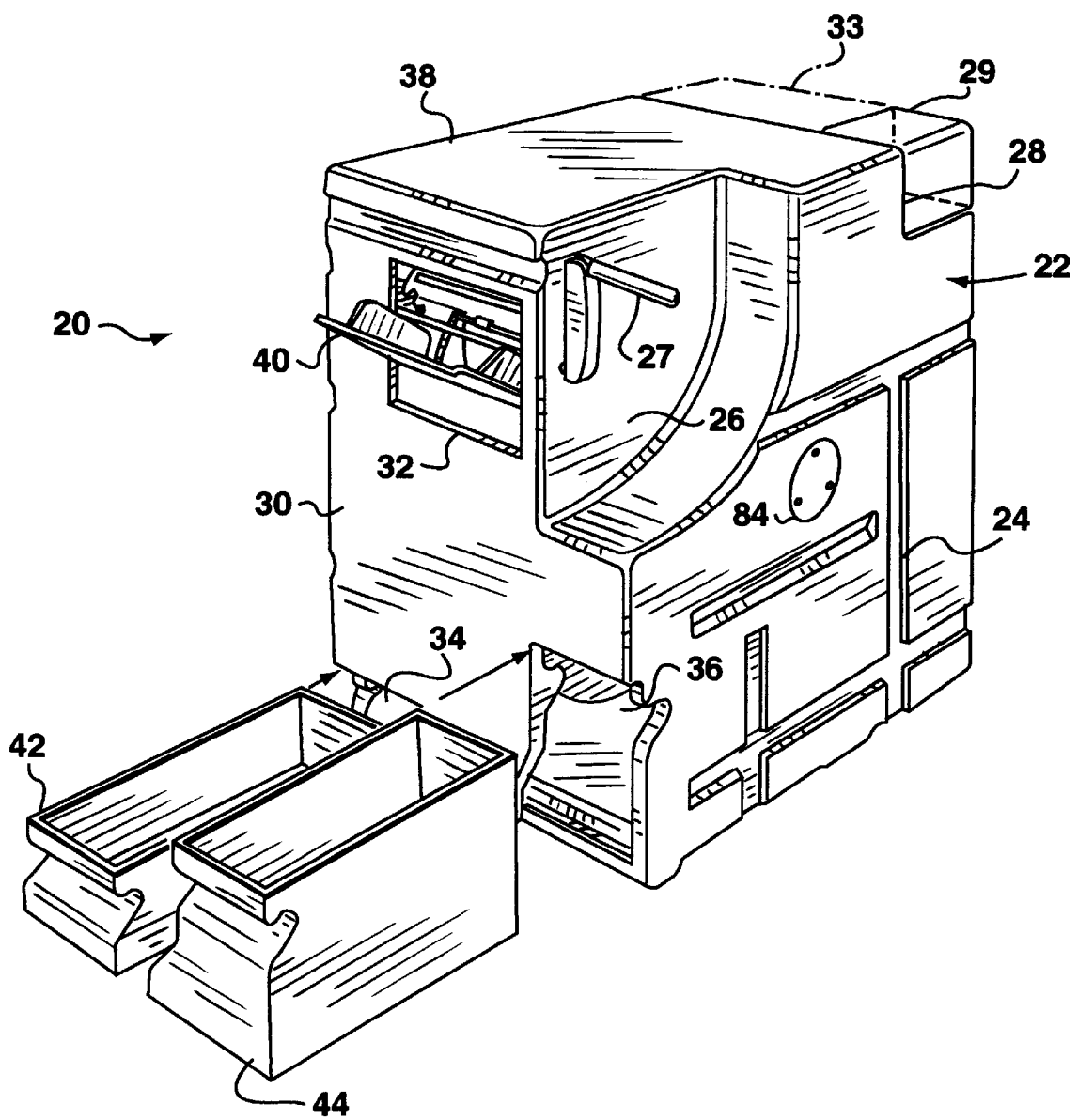
FIG. 1 is a perspective view from the front and to one side of a kitchen waste composter in accordance with the invention with a liquid drain tray and a compost finishing drawer removed from the composter.
Figure 2:
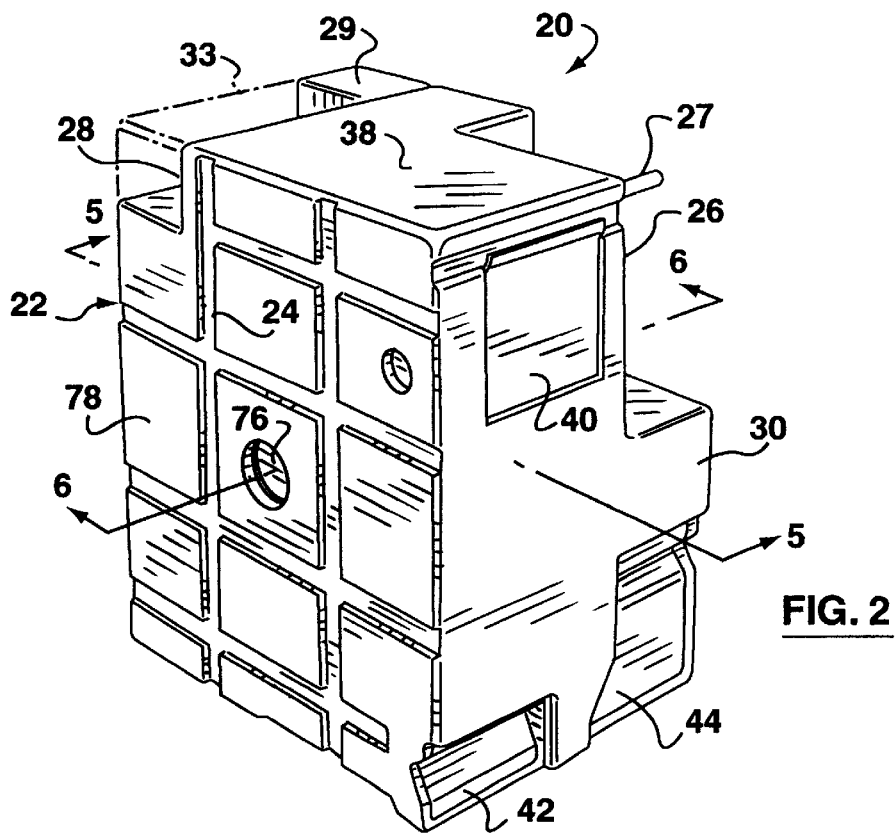
FIG. 2 is a similar view to FIG. 1 from the other side of the composter.

A kitchen waste composter made in accordance with the invention is generally indicated in FIG. 1 by reference numeral 20. The composter 20 comprises an outer housing 22 which is rotation-molded from synthetic plastic material and has a wall thickness of 5 mm selected to provide sufficient rigidity to be self-supporting and to additionally provide structural support for the drum components rotatably supported inside the housing, as described further below. It will be seen that planar vertical surfaces of the housing are formed with a matrix of ridges 24 in order to provide additional structural support and reinforcement.

While the housing has a generally cuboid configuration, it will be observed that selected portions have a stepped profile in order to optimize the use of space so as to accommodate a hand crank 27 disposed on a side panel 26 and fan assembly 29 disposed on a rear panel 28.

A front panel 30 for the housing has three openings 32, 34, 36 formed therein. The opening 32 is formed adjacent a top panel 38 and has a hinged door 40 defining a chute or waste inlet means through which kitchen waste comprising vegetable matter is introduced into the composter 20. The openings 34, 36 are formed adjacent to each other at the bottom of the front panel 30, opening 34 accommodating a shallow liquid drain tray 42 and opening 36 accommodating a deep compost finishing drawer 44.

As will be seen in FIGS. 3 to 7, an outer drum 46 having an axis for rotation which is disposed horizontally for rotation of the outer drum inside the housing 22 comprises an outer cylindrical wall 48, a closed end wall 50 and an open end wall 52 defining an opening adapted to receive an inner drum 54.

Figure 6:
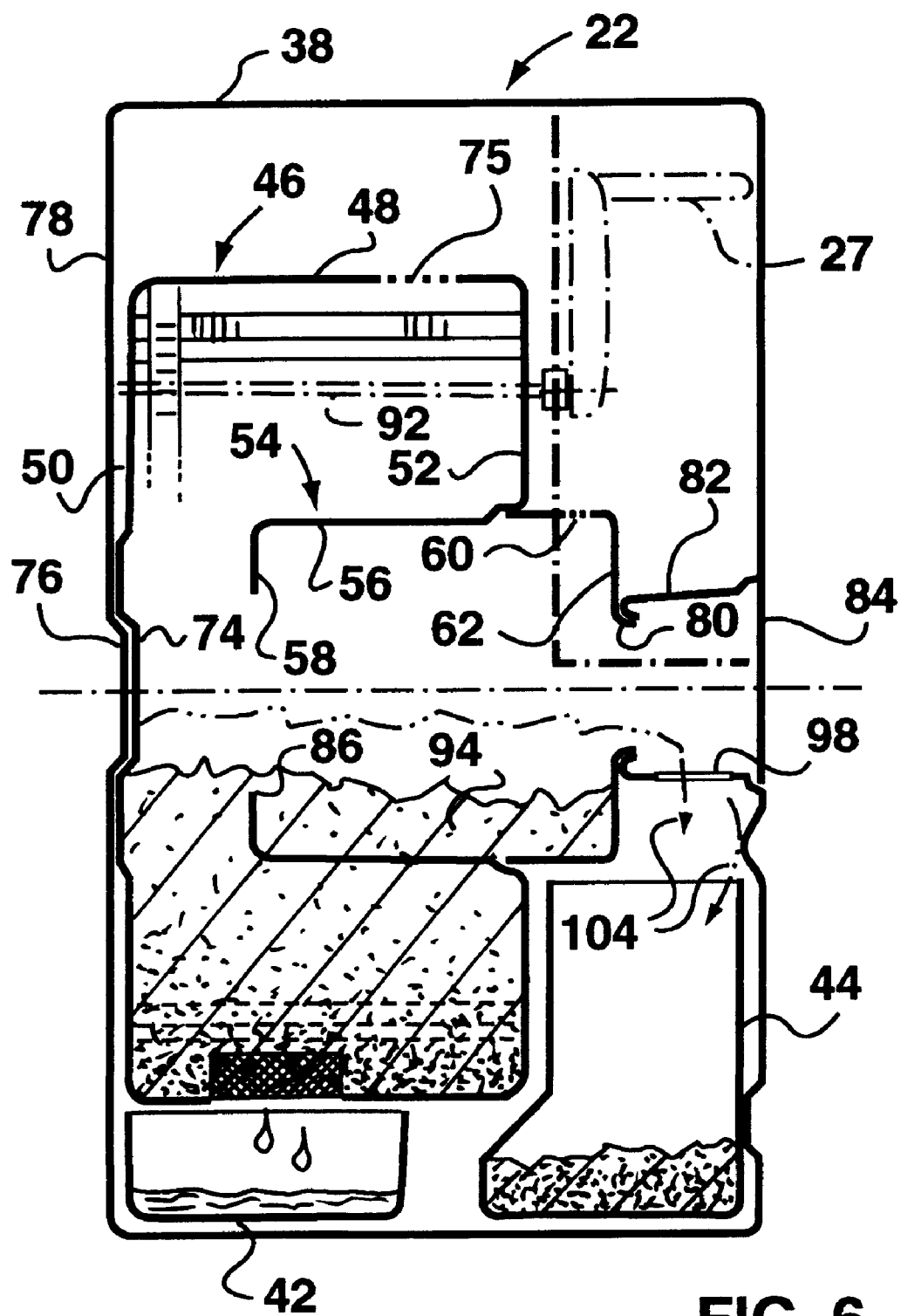
FIG. 6 is a schematic sectional front view drawn on line 6—6 of FIG. 2.
Figure 7:
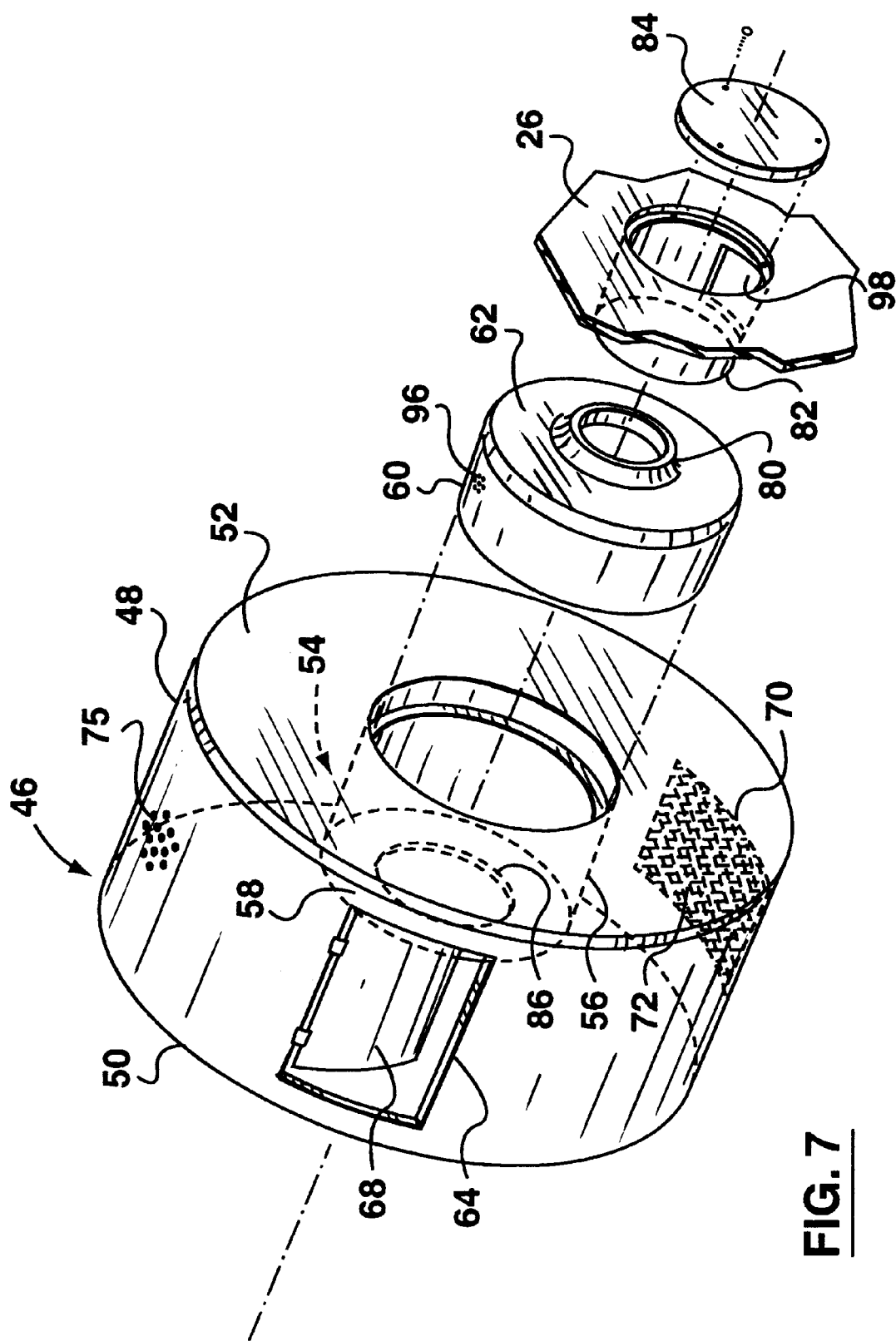
FIG. 7 is an exploded view showing the assembly of the inner drum and outer drum and a boss formed in the outer housing for supporting the inner drum during rotation thereof.

The inner drum 54 is adapted to rotate with the outer drum on the same horizontal axis for rotation. The inner drum 54 comprises an inner sleeve having an outer cylindrical wall 56 and an open end wall 58 formed integrally with the open end wall 52 of the outer drum 46. An outer sleeve having an outer cylindrical wall 60 and an open end wall 62 is joined to the inner sleeve to define the inner drum 54, the outer cylindrical walls 56, 60 together defining a side wall for the inner drum 54 (FIGS. 6, 7). It will be appreciated that the inner drum 54 is partially disposed inside the outer drum 46 so that the open end wall 58 is spaced from the closed end wall 50.

The outer drum 46 has waste inlet means in the form of an opening 64 (FIG. 5) formed in the outer cylindrical wall 46 and which may be brought into communication with the chute 40 defining the waste inlet means for the housing 22 upon rotation of the drum. The opening 64 is normally closed during rotation of the outer drum 46 indicated by directional arrow 66 in FIG. 5 by means of a hinged flap 68. It will be appreciated that the flap 68 hangs vertically inside of the outer drum 46 so as to liberate the opening 64 when it is brought into alignment with the chute 40. Kitchen waste which is introduced into the housing 22 is thus received inside the outer drum 46.

Alignment of the opening 64 with the chute 40 is executed with the help of stop means 69 comprising a flexible guide plate 71 anchored at one end of the housing 22 and biased toward engagement with the surface of the outer drum 46. A complementary recess 73 formed in the surface of the outer drum 46 receives the guide plate 71 and is engaged by the guide plate 71 if the outer drum 46 is rotated in the opposite direction. It will be understood that the stop means 69 do not operate to obstruct any rotational movement of the outer drum 46 in the direction of rotation 66 and that an audible "clap" will be heard when the guide plate 71 falls from the surface of the outer drum 46 to the recess 73, thereby alerting the user that the required openings are in alignment.

Figure 5:
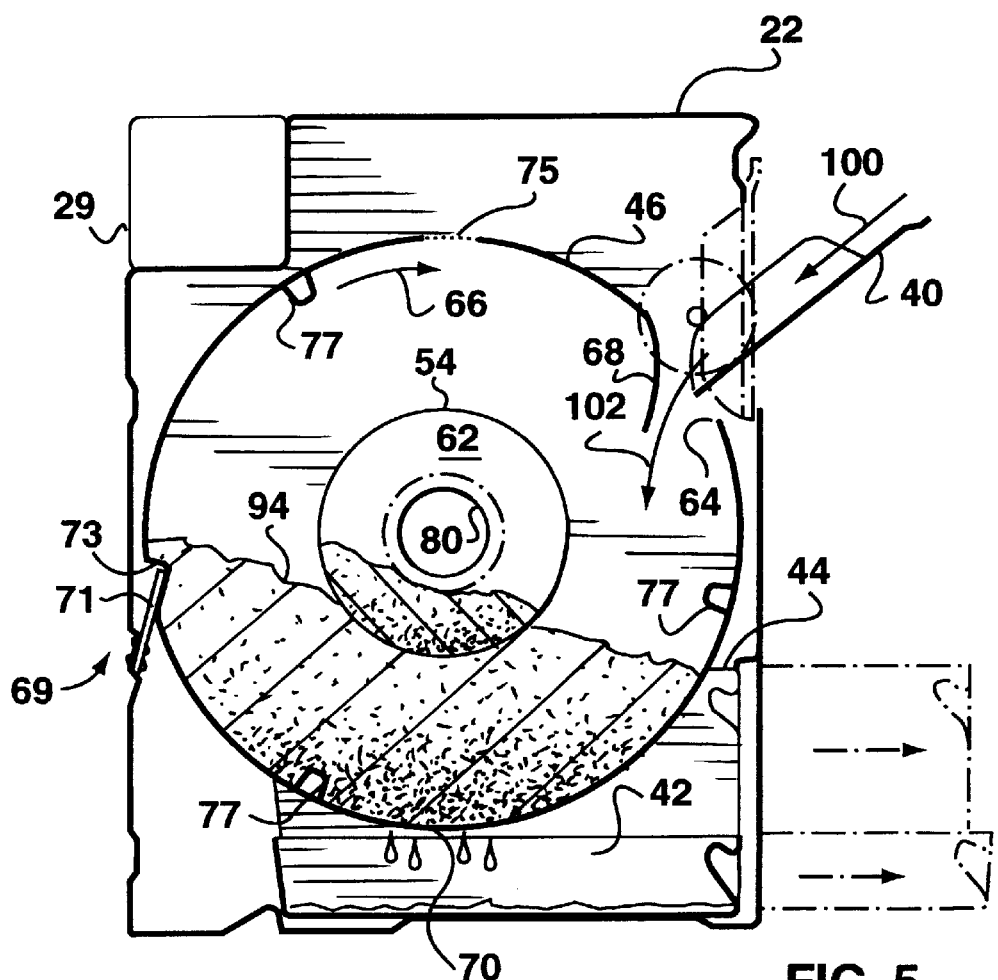
FIG. 5 is a schematic sectional side view drawn on line 5—5 of FIG. 2.

As will be apparent from FIG. 5, waste material 94 received in the outer drum 46 will come to rest inside the drum to form a heap which is deeper at the back of the housing 22 (drawn to the left in FIG. 5) and is shallower at the front of the housing immediately beneath the opening 64. In this way, more space is provided close to the chute 40 where bulky fresh waste material is received into the composter.

A number of ribs 77 are formed on the interior surface of the outer drum 46 to assist in lifting waste as the drum rotates.

A second opening 70 is formed in the outer cylindrical wall 56 of the outer drum 46 remote from the waste inlet opening 64 and positioned so as to lie at the bottom of the outer drum 46 when the waste inlet openings 64 and 32 are brought into alignment. The opening 70 is covered with a mesh 72 to define liquid outlet means whereby liquid will drain from the outer drum 46 into the liquid drain tray 42.

A vent defined by perforations 75 is formed in the outer drum 46 and is diametrically opposite from the opening 70. While composting of vegetable waste matter is odorless with proper aeration of the waste, the composter 20 includes a fan assembly 29 which is in open communication with the interior of the housing 22. The discharge air from the fan assembly 29 is optionally directed through an outlet pipe 31 (drawn in chain-dotted outline in FIG. 3) which is installed to vent any decomposition gases through an exterior wall of the kitchen. Alternatively, the discharge air from the fan assembly 29 is directed to an activated carbon filter 33 (drawn as a block in chain-dotted outline in FIG. 3) which may be replaced periodically, as the need arises.

The closed end wall 50 of the outer drum 46 is inwardly deformed on its horizontal axis to define a bushing 74 (FIGS. 4, 6) that receives a first boss 76 formed in a left side panel 78 of the housing 22. The boss 76 is adapted to support the outer drum 46 during rotation of the drum.

The drum is similarly supported at the other end by the open end wall 62 of the inner drum which forms a bushing 80 (FIGS. 6, 7) rotatably received inside a second boss 82 defined by an inwardly-directed cylinder integrally formed with the right side panel 26 of the housing 22. Conveniently, the second boss 82 is closed at its outer end by a disc 84 which, in use, is cut from the open end wall 58 of the inner drum 54 to define a waste inlet means 86 to the inner drum.

It will be appreciated that, when a predetermined volume of waste has accumulated in the outer drum 46, continued rotation of the outer drum 46 will cause such waste to enter the inner drum 54 through the waste inlet means 86. The quantity of waste which is admitted to the inner drum from the outer drum is, in part, determined by the relative position of the inner drum to the outer drum.

Figure 8:
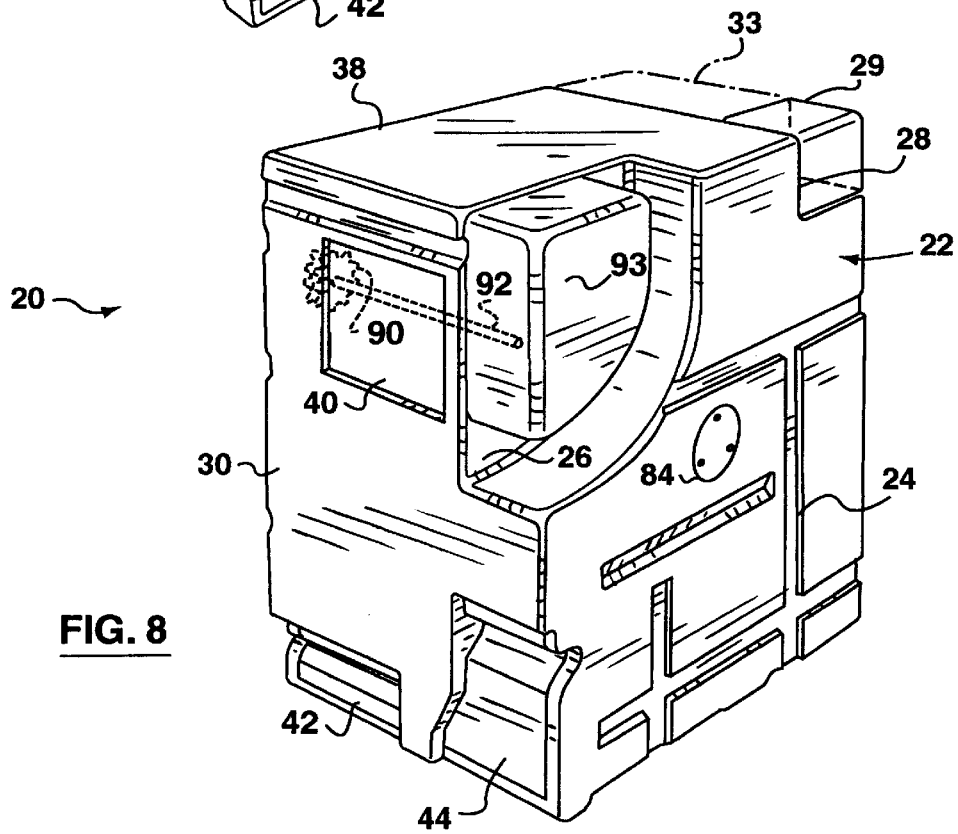
FIG. 8 is a similar view to FIG. 1 showing an alternative embodiment of the invention which includes a motor drive assembly.
Figure 3:
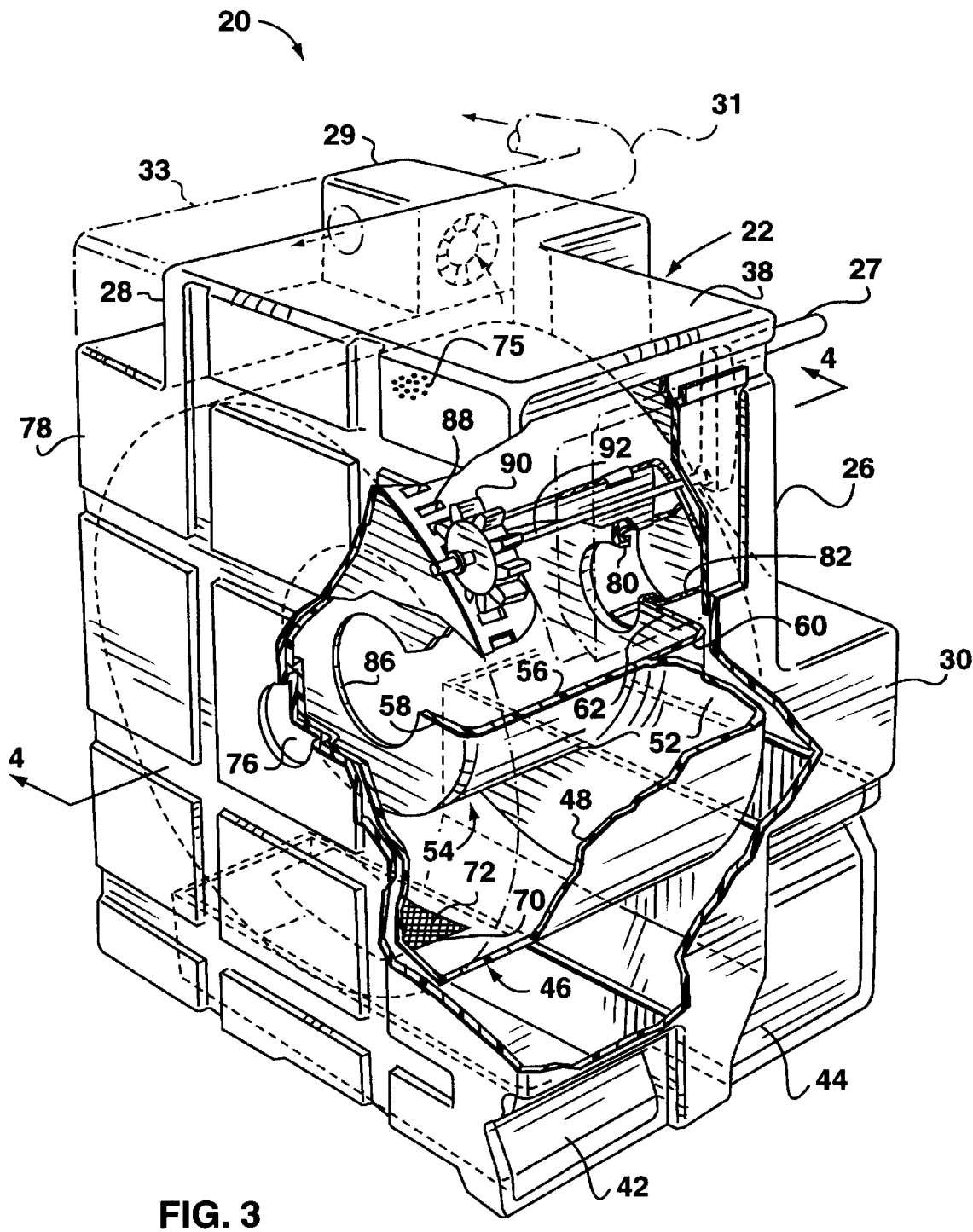
FIG. 3 is a similar view to FIG. 2 (drawn to a larger scale) and partially cut away to show an outer drum and an inner drum located inside an outer housing of the composter.
Figure 4:
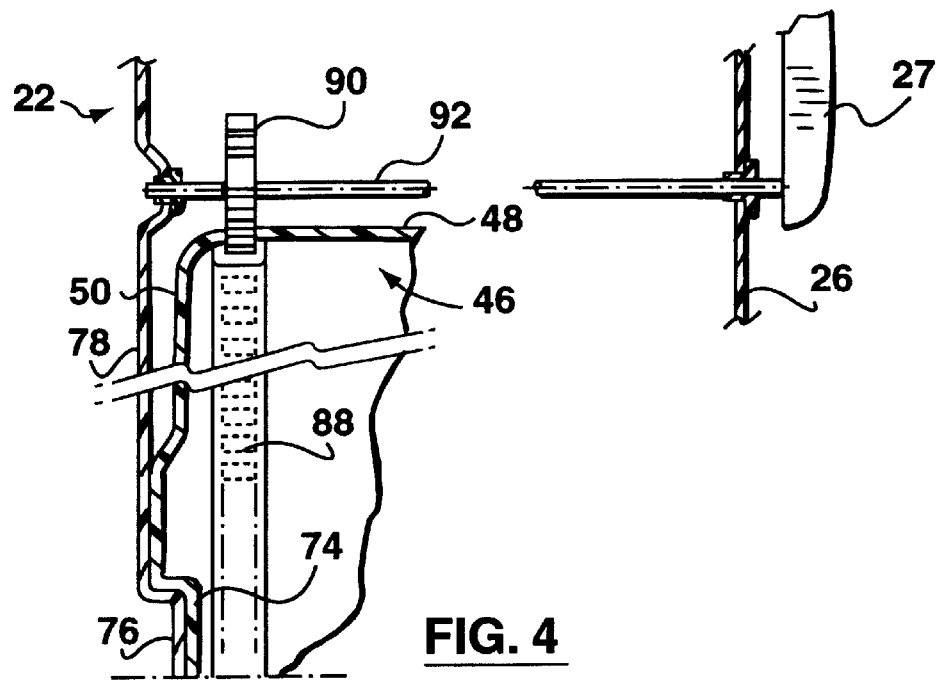
FIG. 4 is a sectional view drawn on line 4—4 of FIG. 3.

The outer drum has a gear rim 88 (FIG. 3) formed in the outer cylindrical wall 48 adjacent to the closed end wall 50. A pinion wheel 90 is disposed outside of the outer drum to cooperate with the gear rim 88 and is supported on a drive shaft 92 of which the ends are likewise supported by the left and right side panels 78, 26 of the housing 22. The hand crank 27 is turned to rotate the pinion wheel 90 which, in turn, drives the outer drum 46 for rotation inside the housing 22. Alternatively, the drive shaft 92 may be operatively connected to a motor drive assembly 93 shown schematically in FIG. 8.

It will be appreciated that rotation of the outer drum 46 causes the inner drum 54 to rotate with it and to thereby move decomposing waste indicated by reference numeral 94 so that it exits through waste outlet means defined by the bushing 80 formed in the open end wall 62. Additional drainage of excess liquid is afforded by liquid outlet means 96 (FIG. 7) formed in the outer cylindrical wall 60. Decomposing waste which leaves the inner drum 54 is discharged for final decomposition in the compost finishing drawer 44 through an opening 98 formed in the second boss 82.

The flow of waste material thus proceeds from the chute 40 into the housing 22 as indicated by directional arrow 100 (FIG. 5) where it is discharged into the outer housing 46 as indicated by directional arrow 102. The waste 94 settles at the bottom of the outer drum 46 where excess liquid is drained through opening 70 into the liquid drain tray 42. When the volume of waste material reaches the height of the inner drum 54, a significant proportion of the waste has been in residence in the outer drum 46 for sufficient length of time to begin decomposition. It will be understood that heavier waste which requires a longer residence time to decompose travels more slowly through the composter while lighter waste material, which generally requires a shorter residence time tends to remain on top of the heap and travels more quickly through the composter.

An overflow of such decomposed waste material is received into the inner drum 54 where the residence time is still further prolonged until it exits as indicated by directional arrows 104 (FIG. 6). Still further decomposition takes place in the finishing drawer 44, which is disposed to receive the decomposed waste emerging from the inner drum and which occupies a significant height inside the housing so as to maximize its capacity.

It will thus be appreciated that the configuration of the outer drum 46 with the inner drum 54 disposed inside, allows for a two-stage decomposition of waste matter, thereby maximizing the capacity of the composter while occupying a minimum of space which is customarily at a premium in the kitchen environment.

It will be further appreciated that several variations may be made to the above described embodiment within the scope of the appended claims. In particular, it will be noted that the inner drum may be formed as a discrete piece of the composter and that its axis of rotation may be spaced from, and parallel to, the axis of rotation of the outer drum. In this way, the inner drum may be rotated independently of the outer drum to thereby regulate the flow of waste material through the composter.

I claim:

1. A composter adapted to receive kitchen waste, the composter comprising:

an outer housing;

an outer drum having an axis for rotation which is disposed horizontally for rotation of the outer drum inside the outer housing, the outer drum having a closed end wall which is rotatably supported by said housing, and an open end wall defining an opening for receiving an inner drum through said opening, the outer drum and the housing having respective waste inlet means in communication with each other for receiving waste so that waste introduced into the housing is received inside the outer drum;

the inner drum having an axis for rotation which is disposed horizontally for rotation of the inner drum, the inner drum having waste inlet means formed in a first end wall thereof disposed inside the outer drum and spaced from said closed end wall of the outer drum to receive waste into the inner drum from the outer drum, and waste outlet means formed in a second end wall of the inner drum spaced from the first end wall for discharging decomposing waste from the inner drum, said first and second end walls retaining a portion of said decomposing waste in the inner drum for further decomposition;

liquid outlet means formed in a side wall of the outer drum remote from the waste inlet means to the outer drum;

a liquid drain tray disposed beneath said liquid outlet means and adapted to be removed from the housing;

a compost finishing drawer for receiving decomposing waste exiting from said waste outlet means and adapted to be removed from the housing;

rotation means for turning the outer drum and adapted to mix waste received inside the outer drum, and to cause decomposing waste to enter the waste inlet means of the inner drum for further decomposition; and rotation means for turning the inner drum to mix waste received inside the inner drum and to cause decomposing waste to leave the waste outlet means of the inner drum for final decomposition in the compost finishing drawer.

2. Composter according to claim 1 in which the inner drum is adapted to rotate with the outer drum.

3. Composter according to claim 1 in which the closed end wall of the outer drum is inwardly deformed to define a bushing for receiving a first boss formed in the housing, the first boss being adapted to support the outer drum during rotation thereof.

4. Composter according to claim 1 in which the outer drum has a gear rim adapted to cooperate with a pinion wheel disposed outside the outer drum and supported on a drive shaft which is supported by walls of the outer housing, rotation means being disposed outside of the outer housing for rotation of the drive shaft.

5. Composter according to claim 4 in which the rotation means comprises a hand crank and the outer housing has a stepped exterior to accommodate the hand crank during rotation thereof.

6. Composter according to claim 4 in which the rotation means comprises a motor.

7. A composter adapted to receive kitchen waste, the composter comprising:

an outer housing;

an outer drum having an axis for rotation which is disposed horizontally for rotation of the outer drum inside the outer housing and an open end wall defining an opening for receiving an inner drum through said opening, the outer drum having a closed end wall which is rotatably supported by said housing, the outer drum and the housing having respective waste inlet means in communication with each other for receiving waste so that waste introduced into the housing is received inside the outer drum;

the inner drum having an axis for rotation which is disposed horizontally for rotation with said outer drum, the inner drum including an inwardly-directed sleeve integrally formed with the outer drum and extending inwardly from said open end wall, toward said closed end wall, the inner drum having waste inlet means formed in a first end wall thereof disposed inside the outer drum and spaced from said closed end wall of the outer drum to receive waste into the inner drum from the outer drum, the inner drum having waste outlet means formed in a second end wall of the inner drum spaced from the first end wall for discharging decomposing waste from the inner drum, said first and second end walls retaining a portion of said decomposing waste in the inner drum for further decomposition;

liquid outlet means formed in a side wall of the outer drum remote from the waste inlet means to the outer drum;

a liquid drain tray disposed beneath said liquid outlet means and adapted to be removed from the housing;

a compost finishing drawer for receiving decomposing waste exiting from said waste outlet means and adapted to be removed from the housing;

rotation means for turning the outer drum and adapted to mix waste received inside the outer drum, and to cause decomposing waste to enter the waste inlet means of the inner drum for further decomposition; and rotation means for turning the inner drum to mix waste received inside the inner drum and to cause decomposing waste to leave the waste outlet means of the inner drum for final decomposition in the compost finishing drawer.

8. Composter according to claim 7 in which the inner drum additionally includes an outwardly directed sleeve having an outer cylindrical wall and an open end wall defining said waste outlet means, the outwardly directed sleeve and inwardly directed sleeve together defining a side wall for said inner drum.

9. Composter according to claim 8 in which the open end wall of the outwardly directed sleeve defines a bushing for receiving a second boss formed in the outer housing for supporting the inner drum during rotation thereof.

10. Composter according to claim 9 in which said second boss has an opening therein for receiving decomposed waste exiting the waste outlet means of the inner drum.

* * * * *